United States Patent
Malrait et al.

(10) Patent No.: US 7,646,164 B2
(45) Date of Patent: Jan. 12, 2010

(54) METHOD OF ADJUSTING PARAMETERS OF A SYNCHRONOUS MOTOR AND VARIABLE SPEED DRIVE USING SUCH A METHOD

(75) Inventors: Francois Malrait, Jouy sur Eure (FR); Stefan Capitaneanu, Mousseaux Neuville (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 342 days.

(21) Appl. No.: 11/780,213

(22) Filed: Jul. 19, 2007

(65) Prior Publication Data
US 2008/0018288 A1    Jan. 24, 2008

(30) Foreign Application Priority Data
Jul. 20, 2006    (FR)    ................................ 06 53038

(51) Int. Cl.
*H02P 23/14*    (2006.01)

(52) U.S. Cl. .................... 318/721; 318/720; 318/700
(58) Field of Classification Search ................. 318/721, 318/720, 700
See application file for complete search history.

(56) References Cited

U.S. PATENT DOCUMENTS

| 6,188,196 | B1* | 2/2001 | Koide et al. .................. 318/700 |
| 6,933,702 | B2* | 8/2005 | Hsu ........................... 318/804 |
| 7,202,629 | B2  | 4/2007 | Jadot et al. |
| 7,339,344 | B2* | 3/2008 | Borisavljevic .............. 318/723 |

FOREIGN PATENT DOCUMENTS

| EP | 1 220 439 A2 | 7/2002 |
| EP | 1 557 940 A2 | 7/2005 |

\* cited by examiner

*Primary Examiner*—Bentsu Ro
*Assistant Examiner*—David S Luo
(74) *Attorney, Agent, or Firm*—Oblon, Spivak, McClelland, Maier & Neustadt, L.L.P.

(57) ABSTRACT

The invention relates to a method of adjusting motor parameters in a variable speed drive intended for controlling a synchronous electric motor with permanent magnets M. The method comprises a step of determining the deviations $\Delta I_D$ and $\Delta I_Q$ between references and measurements of the flux current and motor torque current, a step of calculating a correction value $\Delta R_S$ of the stator resistance, a correction value $\Delta L$ of the inductance and a correction value $\Delta K_E$ of the flux constant of the motor, on the basis of the integral terms of the deviations $\Delta I_D$ and $\Delta I_Q$, a step of adjusting the values of the parameters of the motor model on the basis of $\Delta R_S$, $\Delta L$ and $\Delta K_E$, a step of formulating the control voltages $U_D$ and $U_Q$ to be applied to the motor M by using the said adjusted values of the motor parameters.

6 Claims, 1 Drawing Sheet

Figure 1:
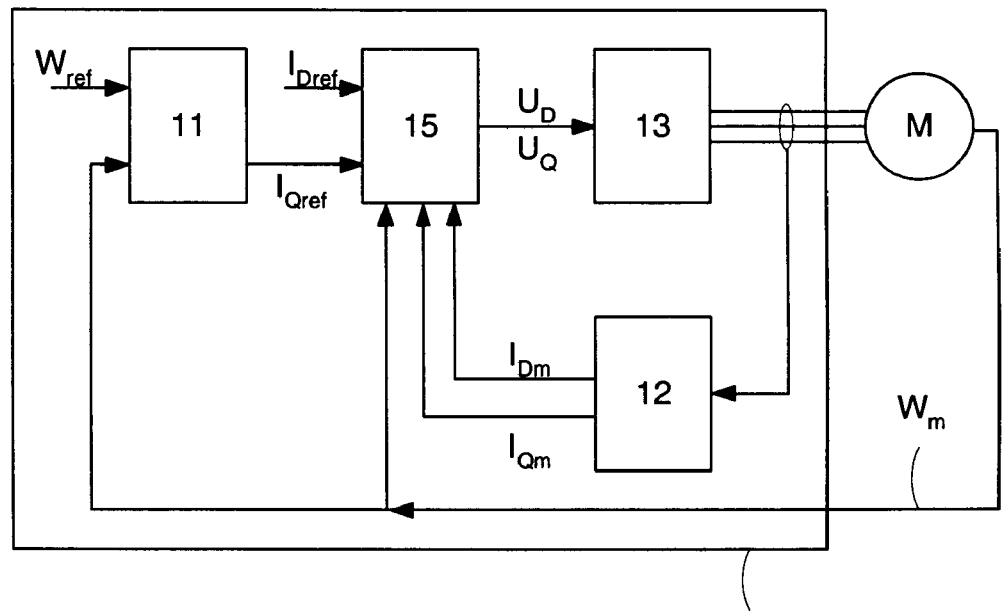

METHOD OF ADJUSTING PARAMETERS OF A SYNCHRONOUS MOTOR AND VARIABLE SPEED DRIVE USING SUCH A METHOD

The present invention pertains to a method of adjusting motor parameters in an electronic variable speed drive, of frequency converter type, intended for monitoring and controlling an electric motor of synchronous type with permanent magnets at the rotor, also called a PMSM motor (Permanent Magnet Synchronous Motor). The invention also relates to a variable speed drive implementing such a method.

An electronic variable speed drive of frequency converter type is charged with controlling a three-phase PMSM motor. The variable drive is supplied by a fixed frequency AC electrical network and delivers to the motor an AC current supply whose voltage and frequency are variable, depending on the speed setpoints and requirements of the application. For this purpose, a variable speed drive comprises a processing unit capable of commanding control electronics.

To obtain good motor performance, the control of the variable speed drive must be based on a reliable representation of an electrical model of the motor using a set of physical parameters. It is therefore necessary to ascertain a certain number of data representative of the characteristics of the motor in order to establish this model.

Some of these motor data are provided by the constructor of the electric motor to be controlled. These data are usually written in the documentation of the motor, for example.

However, not all the data necessary for formulating the model of the motor are always reliable or they may depend on the environment of the motor, and it is therefore necessary to estimate certain parameters, by calculation or by measurement with the aid of various conceivable procedures, to obtain a faithful model of the motor. These procedures use for example a prior motor identification or auto-training phase or else they store, in the variable drive, series of estimated values corresponding to the parameters to be estimated with the aid of data tables or calculate certain parameters by means of empirical equations.

In particular, the following electrical parameters may be poorly known during operation: the stator resistance of the motor $R_S$, the flux constant of the motor $K_E$ (or electromotive force constant) and the components of the motor inductance $L_D$ and $L_Q$, respectively along the axis d and along the axis q, the reference frame d,q being an orthogonal reference frame turning at the speed of rotation of the motor.

Moreover, certain motor parameters may evolve over time during motor operation, in particular the stator resistance $R_S$ which fluctuates a great deal with the temperature of the motor. If, at a given instant, there is an error in the estimation of the value of this stator resistance $R_S$, then the electric current provided to the motor by the variable drive may be bigger than necessary at the nominal operating point of the motor.

Likewise, the components of the motor inductance of axis d $L_D$ and of axis q $L_Q$ of the motor may vary during operation in a defluxing zone (beyond the nominal speed). Now, the dynamic accuracy of the torque provided by the motor depends on the accuracy of the value of the motor inductance. When the motor is driven by a zero current of axis d (or flux current), the error in the inductance $L_D$ of axis d is not observable. It is nevertheless preferable to adapt it by homogeneity in the same manner as the inductance $L_Q$ of axis q.

Likewise, the value of the flux constant $K_E$ of the motor may vary during operation in a defluxing zone or with the temperature of the motor. Now, the accuracy of the torque provided by the motor depends on the accuracy of the value of the flux constant.

The performance of the variable drive+motor assembly may thus be degraded, causing problems with consumption, overheating or generating oscillations in current, speed and torque. It would therefore be nice to be able to adjust, during operation, the parameters estimated beforehand so as to optimize the control of the motor.

Document EP1220439 describes a procedure for determining the parameters of a motor with permanent magnets, in particular the stator resistance $R_S$, the motor inductance $L_D$, $L_Q$, and the flux constant $K_E$. However, this procedure requires the use of numerous sensors to perform, in particular, measurements of motor temperature, motor voltages, motor torque, motor rotation, thereby rendering its application difficult and expensive in a variable speed drive.

This is why the aim of the invention is, when a measurement of the motor speed exists in the variable drive (that is to say with closed-loop operation), to correct in real time the values of the stator resistance $R_S$ of the motor, of the components $L_D$ and $L_Q$ of the motor inductance and of the flux constant $K_E$ of the motor, by using the integral term of the current loop, thus making it possible to adjust the values of the parameters of the motor model, without requiring, in particular, measurements of temperature or torque at the motor level.

For this purpose, the invention describes a method of adjusting motor parameters in a variable speed drive intended for controlling a PMSM synchronous electric motor. The method comprises a step of determining a first deviation between a reference of the motor torque current and a measurement of the motor torque current, and a second deviation between a reference of the motor flux current and a measurement of the motor flux current, a step of calculating a correction value of the stator resistance of the motor, a correction value of the motor inductance and a correction value of the flux constant of the motor, on the basis of the integral term of the said first deviation and of the integral term of the said second deviation, a step of adjusting the values of the parameters of the motor model on the basis of the said correction values of the stator resistance of the motor, of the motor inductance and of the flux constant of the motor and a step of formulating the control voltages to be applied to the motor by using the said adjusted values of the motor parameters.

According to one characteristic, the reference of the torque current is obtained on the basis of a reference of the motor speed and of a measurement of the speed of the motor.

According to another characteristic, the adjustment of the value of a parameter of the motor model is performed during the adjustment step only when the value of one or more quantities characteristic of this parameter exceeds a predetermined threshold, this value or these values depending on the motor speed measurement and the reference of the motor torque current.

The invention also describes a variable speed drive furnished with a processing unit comprising a current regulator block providing control voltages for the motor. The current regulator block comprises an integrator block, an adaptor block and a compensation block for implementing the method of adjusting motor parameters.

Figure 2:
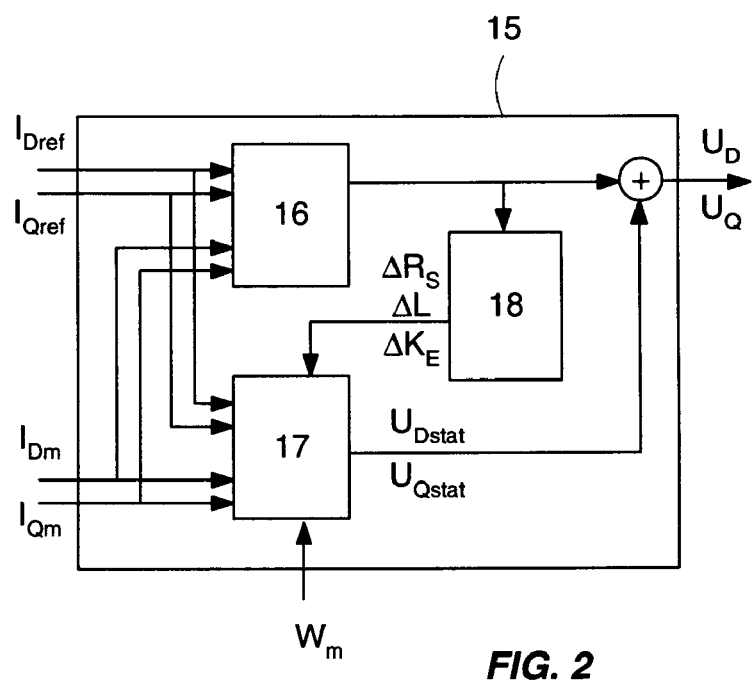

Other characteristics and advantages will appear in the detailed description which follows while referring to an embodiment given by way of example and represented by the appended drawings in which:

FIG. 1 represents a simplified diagram of the control of a synchronous motor according to the invention, FIG. 2 details the current regulator block 15 of FIG. 1.

With reference to FIG. 1, a variable speed drive, of frequency converter type, is charged with controlling and monitoring a synchronous three-phase electric motor M of PMSM type, by virtue of a processing unit 10 capable in particular of commanding control electronics (not represented in FIG. 1). A speed sensor makes it possible to provide the variable drive with feedback of the real speed of the motor $W_m$.

Subsequently, the reference of the current of axis q $I_{Qref}$ will be denoted torque current reference $I_{Qref}$ and the reference of the current of axis d $I_{Dref}$ will be denoted flux current reference $I_{Dref}$. The latter notation is used even if, in the normal operating span of a PMSM motor, the flux current $I_{Dref}$ is equal to zero since the flux is already present by virtue of the magnet of the motor. Nevertheless, in the event of defluxing the flux current can be different from zero. As indicated previously, the reference frame d,q is an orthogonal reference frame turning at the speed of rotation of the motor.

The processing unit 10 of the variable speed drive comprises a speed regulator block 11 which receives as input a reference of the motor speed $W_{ref}$ and the motor speed measurement $W_m$, so as to deliver as output a reference of the motor torque current $I_{Qref}$. This reference of the torque current $I_{Qref}$ is accurately determined since it relies on a measured real value $W_m$ of the motor speed.

The processing unit 10 of the variable speed drive thereafter comprises a current regulator block 15 which receives as input a reference of the motor flux current $I_{Dref}$ and the reference of the motor torque current $I_{Qref}$ arising from the block 11. The block 15 also receives the measured values of the torque current and motor flux current, respectively $I_{Qm}$, $I_{Dm}$, as well as the motor speed measurement $W_m$. The values $I_{Qm}$, $I_{Dm}$ can originate from a converter block 12 which in a known manner transforms measurements arising from sensors of current on the supply conductors of the motor (that is to say conversion by rotation of the currents of the three phases of the motor into coordinates in the reference frame d,q).

The current regulator block 15 provides as output flux control and torque control voltages $U_D$, $U_Q$, respectively, to a converter block 13 which transforms them in a known manner into voltage setpoints bound for control electronics supplying the various phases of the motor M by means of semiconductor power components.

According to the invention, the current regulator block 15 comprises an integrator block 16 which calculates the integral term of a first deviation $\Delta I_Q$ existing between the reference of the motor torque current $I_{Qref}$ and the measurement of the motor torque current $I_{Qm}$, and the integral term of a second deviation $\Delta I_D$ existing between the reference of the motor flux current $I_{Dref}$ and the measurement of the motor flux current $I_{Dm}$.

At the equilibrium operating point of the motor, we have the following relation written in vector form:

$$\begin{pmatrix} \int (I_{Dref} - I_{Dm}) \\ \int (I_{Qref} - I_{Qm}) \end{pmatrix} = \begin{pmatrix} \int \Delta I_D \\ \int \Delta I_Q \end{pmatrix} = k \begin{pmatrix} \Delta R_S \\ \Delta L \\ \Delta K_E \end{pmatrix}$$

in which $\Delta R_S$ represents the relative correction value of the stator resistance $R_S$, $\Delta K_E$ represents the relative correction value of the flux constant $K_E$ and $\Delta L$ represents the relative correction value of the motor inductance. Specifically, $\Delta L_D$ is likened to the measured correction value $\Delta L_Q$ and they are named simply $\Delta L$. According to one embodiment, it is possible to envisage a correction value $\Delta L$ pertaining only to the component of axis q $L_Q$ of the motor inductance. Nevertheless, it is preferable that the correction value $\Delta L$ pertains to the two components of axis d $L_D$ and of axis q $L_Q$ of the motor inductance.

The coefficient k can be expressed as a transfer matrix dependent on the parameters and the operating point which is obtained through the following relation:

$$\begin{pmatrix} \int \Delta I_D \\ \int \Delta I_Q \end{pmatrix} = \begin{pmatrix} 0 & W_m * L_Q * I_{Qref} & 0 \\ -R_S * I_{Qref} & 0 & W_m * K_E \end{pmatrix} \begin{pmatrix} \Delta R_S \\ \Delta L \\ \Delta K_E \end{pmatrix}$$

Thus, in the steady operating state of the motor, the calculation of the integral terms of the current deviations $\Delta I_D$ and $\Delta I_Q$ make it possible to determine in real time correction values $\Delta R_S$, $\Delta L$ and $\Delta K_E$ to be applied to the stator resistance $R_S$, to the components of axis d $L_D$ and of axis q $L_Q$ of the inductance and to the flux constant $K_E$ of the motor so as to be able to permanently refine the motor model with real values of the stator resistance $R_S$, of the components $L_D$, $L_Q$ of the inductance and of the flux constant $K_E$.

The current regulator block 15 therefore comprises a parameter adaptor block 18 which receives as input the integral terms of $\Delta I_D$ and of $\Delta I_Q$ so as to calculate $\Delta R_S$, $\Delta L$ and $\Delta K_E$ to obtain corrected values of the stator resistance $R_S$, of the components $L_D$, $L_Q$ of the inductance and of the flux constant $K_E$ of the motor, as well as other motor parameters which depend on these parameters, like for example $T_S$, the electrical time constant. By virtue of the invention, so long as the integral terms of $\Delta I_D$ and of $\Delta I_Q$ are not zero, the parameters $R_S$, $L_D$, $L_Q$ and $K_E$ will be adjusted, thus making it possible to continuously improve the parameters of the motor model. Once the exact values of $R_S$, $L_D$, $L_Q$ and $K_E$ have been attained, the integral terms of $\Delta I_D$ and of $\Delta I_Q$ will then converge to zero.

The new corrected parameters are thereafter introduced into a compensation block 17 (also called feed-forward) which calculates the static parts (offset) of the flux control voltage $U_{Dstat}$ and of the torque control voltage $U_{Qstat}$, by virtue of the following relations:

$$U_{Dstat} = R_S * I_{Dref} - L_Q * W_m * I_{Qref}$$

$$U_{Qstat} = R_S * I_{Qref} + L_D * W_m * I_{Dref} + W_m * K_E$$

The static parts of the voltages $U_{Dstat}$, $U_{Qstat}$ arising from the compensation block 17 are thereafter added to the proportional and integral terms of respectively $\Delta I_D$, $\Delta I_Q$ arising from the output of the integrator block 16, to provide as output of the current regulator block 15 the setpoints of the flux control and torque control voltages $U_D$, $U_Q$, respectively, to be applied to the motor, according to the relations:

$$U_D = U_{Dstat} + K_P * \Delta I_D + K_I * \int \Delta I_D$$

$$U_Q = U_{Qstat} + K_P * \Delta I_Q + K_I * \int \Delta I_Q$$

in which $K_P$ and $K_I$ represent respectively the proportional gain and the integral gain of the current regulation.

The method of adjustment therefore comprises the following steps:
- a step of determining the integral term of the first deviation $\Delta I_Q$, and the integral term of the second deviation $\Delta I_D$, carried out in the integrator block 16,
- a step of calculating the correction value $\Delta R_S$, the correction value $\Delta L$ and the correction value $\Delta K_E$ on the basis of the integral term of the first deviation $\Delta I_Q$ and on the basis of the integral term of the second deviation $\Delta I_D$,
- a step of adjusting the values of the parameters $R_S$, $L_D$, $L_Q$ and $K_E$ of the motor model on the basis of the correction values $\Delta R_S$, $\Delta L$ and $\Delta K_E$, these two steps being carried out in the adaptor block 18,
- a step of formulating as output of the regulator block 15 the flux control voltage $U_D$ and the torque control voltage $U_Q$ applied to the motor M, by using the adjusted values of the motor parameters. This step of formulating $U_D$ and $U_Q$ comprises a step of calculating the static parts $U_{Dstat}$ and $U_{Qstat}$ in the compensation block 17 and a step of adding $U_{Dstat}$ and $U_{Qstat}$ to the proportional and integral terms of $\Delta I_D$ and $\Delta I_Q$ to provide $U_D$ and $U_Q$.

Preferably, the step of adjusting each of the various parameters $R_S$, $L_D$, $L_Q$ and $K_E$ is implemented with the aid of the method described in the present invention under certain conditions. The value of a parameter of the motor model is adjusted only when the value of one or more characteristic quantities associated with this parameter exceeds a predetermined threshold. Specifically, when the value of one or more characteristic quantities associated with these parameters is below a predetermined threshold, the other parameters of the motor become predominant with respect to this parameter to be adjusted. The adjustment of this parameter might therefore induce a relative error which would run the risk of disturbing the proper operation of the method described.

The values of the parameters $R_S$, $L_D$, $L_Q$ and $K_E$ are adjusted in the following manner:

The resistance $R_S$ is adjusted only when the values of its characteristic quantities $|I_{Qref}/W_m|$ and $|I_{Qref}|$ both exceed predetermined thresholds. For example, the threshold for the quantity $|I_{Qref}/W_m|$ corresponds nearly to the ratio between the nominal flux constant $K_E$ stored by default and the stator resistance $R_S$ stored by default and the threshold for the quantity $|I_{Qref}|$ corresponds to the ratio between a minimum voltage and the stator resistance $R_S$ stored by default, this minimum voltage having a value defined as equal to a hundredth of the nominal voltage of the motor.

The components $L_D$, $L_Q$ of the inductance are adjusted only when the quantity $|W_m * I_{Qref}|$ exceeds a predetermined threshold. For example, this threshold corresponds nearly to the ratio between a minimum voltage and the inductance $L_Q$ stored by default, with the value of the minimum voltage defined as equal to a hundredth of the nominal voltage of the motor.

The flux constant $K_E$ is adjusted only when the quantities $|W_m/I_{Qref}|$ and $|W_m|$ both exceed predetermined thresholds. For example, the threshold for the quantity $|W_m/I_{Qref}|$ corresponds nearly to the ratio between the stator resistance stored by default and the flux constant $K_E$ stored by default while the threshold for the quantity $|W_m|$ corresponds to the ratio between a minimum voltage and the flux constant $K_E$ stored by default, the minimum voltage being defined as equal to a hundredth of the nominal voltage of the motor.

It is of course understood that it is possible, without departing from the scope of the invention, to contemplate other variants and refinements of detail and likewise to envisage the use of equivalent means.

The invention claimed is:

1. Method of adjusting motor parameters in a variable speed drive intended for controlling a synchronous electric motor with permanent magnets (M), the method being characterized in that it comprises:
   - a step of determining a first deviation ($\Delta I_Q$) between a reference of the motor torque current ($I_{Qref}$) and a measurement of the motor torque current ($I_{Qm}$), and a second deviation ($\Delta I_D$) between a reference of the motor flux current ($I_{Dref}$) and a measurement of the motor flux current ($I_{Dm}$),
   - a step of calculating a correction value ($\Delta R_S$) of the stator resistance of the motor, a correction value ($\Delta L$) of the motor inductance and a correction value ($\Delta K_E$) of the flux constant of the motor, on the basis of the integral term of the said first deviation ($\Delta I_Q$) and of the integral term of the said second deviation ($\Delta I_D$),
   - a step of adjusting the values of the parameters of the motor model on the basis of the said correction values ($\Delta R_S$, $\Delta L$, $\Delta K_E$) of the stator resistance of the motor, of the motor inductance and of the flux constant of the motor,
   - a step of formulating the control voltages ($U_D$, $U_Q$) to be applied to the motor (M) by using the said adjusted values of the motor parameters.

2. Method according to claim 1, characterized in that the reference of the torque current ($I_{Qref}$) is obtained on the basis of a reference of the motor speed ($W_{ref}$) and of a measurement of the speed of the motor ($W_m$).

3. Method according to claim 2, characterized in that the adjustment of the value of a parameter of the motor model is performed during the adjustment step only when the value of one or more quantities characteristic of this parameter exceeds a predetermined threshold, this value or these values depending on the motor speed measurement ($W_m$) and the reference of the motor torque current ($I_{Qref}$).

4. Variable speed drive intended for controlling a synchronous electric motor with permanent magnets (M), furnished with a processing unit (10) comprising a current regulator block (15) providing control voltages for the motor (M), characterized in that the current regulator block (15) comprises:
   - An integrator block (16) for determining a first deviation ($\Delta I_Q$) between a reference of the motor torque current ($I_{Qref}$) and a measurement of the motor torque current ($I_{Qm}$), and a second deviation ($\Delta I_D$) between a reference of the motor flux current ($I_{Dref}$) and a measurement of the motor flux current ($I_{Dm}$),
   - An adaptor block (18) calculating a correction value ($\Delta R_S$) of the stator resistance of the motor, a correction value ($\Delta L$) of the motor inductance and a correction value ($\Delta K_E$) of the flux constant of the motor, on the basis of the integral term of the said first deviation ($\Delta I_Q$) and of the integral term of the said second deviation ($\Delta I_D$), and adjusting values of the parameters of the motor model on the basis of the said correction values ($\Delta R_S$, $\Delta L$, $\Delta K_E$) of the stator resistance of the motor, of the motor inductance and of the flux constant of the motor,
   - A compensation block (17) using the said adjusted values of the motor parameters to formulate control voltages ($U_D$, $U_Q$) to be applied to the motor (M).

5. Variable speed drive according to claim 4, characterized in that the processing unit (10) comprises a speed regulator block (11) calculating the reference of the torque current ($I_{Qref}$) on the basis of a reference of the motor speed ($W_{ref}$) and of a measurement of the speed of the motor ($W_m$).

6. Variable speed drive according to claim 5, characterized in that the adjustment of the value of a parameter of the motor model is performed in the adaptor block (18) only when the value of one or more quantities characteristic of this parameter exceeds a predetermined threshold, this value or these values depending on the motor speed measurement ($W_m$) and the reference of the motor torque current ($I_{Qref}$).

* * * * *